Dec. 4, 1934.  T. V. BUCKWALTER  1,982,900
BRAKE DRUM
Filed Jan. 5, 1934
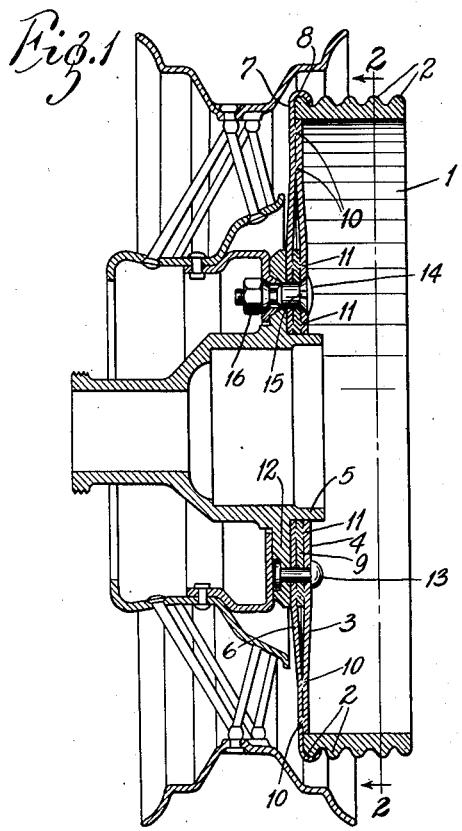
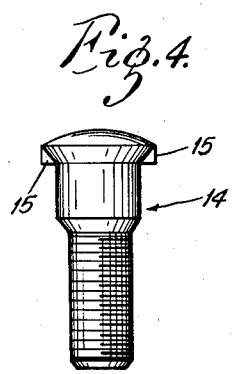
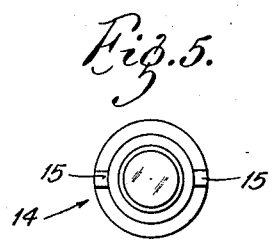
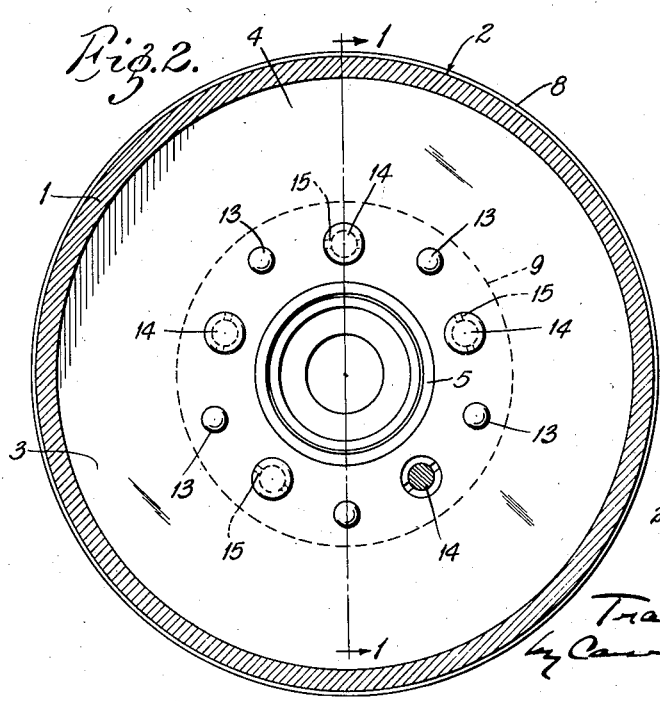
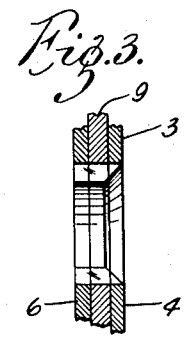
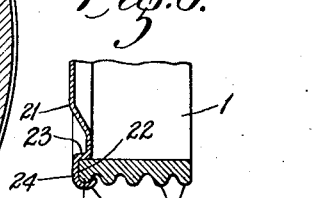
INVENTOR:
Tracy V. Buckwalter
HIS ATTORNEYS.

Patented Dec. 4, 1934

1,982,900

UNITED STATES PATENT OFFICE 1,982,900

BRAKE DRUM

Tracy V. Buckwalter, Canton, Ohio, assignor to The Timken Roller Bearing Company, Canton, Ohio, a corporation of Ohio Application January 5, 1934, Serial No. 705,341

9 Claims. (Cl. 188—218)

My invention relates to brake drums and has for its principal objects to produce a brake drum of great strength for its weight, to assure true roundness of the rim member and concentricity thereof with the hub of the wheel and to provide for facility and economy of manufacture and of assembly with the wheel. The invention consists principally in providing the back with an annular seat for the end of the rim and extending the back beyond and around the end of said rim to mechanically grip and hold the rim. It also consists in making the back member of the brake drum out of circular metal plates or disks whose outer portions are welded together and whose inner margins are spaced apart by an interposed ring to which they are welded. It also consists in mounting the inner end of the rim on the periphery of the inner disk with the marginal portion of the outer disk extending beyond and spun over and against the outer surface of said inner end of the rim member. It also consists in the arrangements and combinations of parts hereinafter described and claimed.

In the accompanying drawing, wherein like reference numerals refer to like parts wherever they occur, Fig. 1 is a longitudinal sectional view of my brake drum mounted on a wheel, the plane of section being indicated by the line 1—1 of Fig. 2, Fig. 2 is a cross-section of my brake drum on the line 2—2 of Fig. 1, Fig. 3 is a fragmental sectional view of the back member in a plane extending through the slots of a bolt hole, Fig. 4 is a side view of a locking bolt, Fig. 5 is an end view thereof looking toward its tip; and Fig. 6 is a detail view of a modification wherein the back member consists of a single plate.

My present brake drum comprises a circular rim 1 of suitable metal with a cylindrical inner surface and with its outer surface provided with a series of annular ribs 2. One end of this rim is mounted on a back member 3. The back member shown in Fig. 1 comprises two concentric circular disks or plates of metal. The inner disk 4 has a central hole adapted to admit or fit over the hub 5 of a wheel and has its outer periphery concentric with said central opening and of proper diameter for the rim to fit over. The second or outer disk 6 of the back member is wider than the inner disk and has a central opening adapted to admit or fit over the hub of the wheel and its outer margin extends considerably beyond the outer edge of the inner disk just mentioned. The inner part 7 of this extending margin of the outer disk abuts against the end of the rim and the outermost part 8 of said margin is spun back tight around the endmost rib 2 of said rim.

Interposed between the inner and outer disks of the back member is a wide thick metal reinforcing and spacing ring 9 with a central eye of the size to admit or fit over the hub of the wheel. The outer portions of the inner and outer disks are welded together, preferably by spot-welding, as indicated at 10, and the inner portions of said disks, together with the interposed ring are likewise welded together as indicated at 11. Thus, the outer portion of the back member comprises two thicknesses of metal integrated by welding, while the central portion comprises three thicknesses of metal integrated by welding.

The back member is mounted on the hub of the wheel with its outer disk 6 seated flatwise against a wide annular flange 12 on said hub, said flange preferably being of the same width as the reinforcing and spacing ring of the back plate. Said back member and said flange are firmly secured together by flat head rivets 13 which extend through holes in the reinforced portion of the rim member. The rivet heads are located in counterbores provided therefor in the outer face of said flange and the inner ends of the rivets are upset against the inner disk. The reinforced portion of the back member is provided with a second circular series of holes adapted to receive locking bolts 14 that detachably clamp the main portion of the wheel thereto. The inner ends of the bolt holes are countersunk, preferably somewhat more than the thickness of the inner disk, to receive the countersunk heads of the bolts. The inner ends of the bolt holes have outwardly extending slots adapted to receive lugs 15 which are provided therefor on the bolts.

The bolt holes extend outwardly through the flange of the hub and are flared or countersunk to receive the raised annular margins of the bolt holes in the securing flange of the wheel. The outer ends of the bolts are screwthreaded and provided with clamping nuts 16 which have tapered shoulders. The bolts are entered into the bolt holes from the inner side of the back member and positioned with their lugs in the slots provided therefor in the back member. The wheel flange is then mounted over said bolts and the nuts mounted on said bolts and tightened, whereby the wheel is securely but detachably mounted in place.

The advantages of the foregoing construction are the following: The parts are very simple and easy to make and to assemble. The mounting rim on the periphery of the inner circular disk insures true roundness of the rim and its concentricity with the disk and consequently of the hub of the wheel. The use of two relatively thin disks together with their outer portions welded directly together and with their inner portions welded to the reinforcing and spacing ring produces a very strong structure which is very well suited for riveting to the flange of the wheel hub and for receiving the holding bolts that detachably secure the wheel. The spinning of the margin of the outer disk over the end of the brake rim member is peculiarly advantageous, especially in cooperation with the support of said ring by the inner disk, because it is effected by a simple operation and produces a tight joint without resort to extraneous fastening devices.

In the construction hereinbefore described, the back member is made of two disks of sheet metal with an interposed reinforcing ring, all welded together. In the modification illustrated in Fig. 6, the back member is made of a single plate or thickness 21 of sheet metal. In this modification, a circular groove 22 is formed in the outer portion of the plate and the inner wall 23 of the groove is made cylindrical and of proper size to fit tight in the end of the rim. The bottom 24 of the groove is radially disposed and serves as an abutment for the end of said rim; and the outermost peripheral portion 25 of the plate is spun back around the endmost rib 2 of the rim so as to tightly grip the same. Thus, the rim is firmly clamped on the seat provided therefor by the groove.

What I claim is:

1. A brake drum comprising a back having an annular groove and a rim having one end tightly fitted in said groove said back comprising a circular plate whose periphery forms the inner wall of said groove and a second circular plate of larger diameter than said first mentioned plate with its marginal portion of angular shape and forming the bottom and outer side of said groove.

2. A brake drum comprising a back and a rim mounted thereon, said back having a circular plate whose periphery forms a seat for the rim and a second plate concentric therewith with its marginal portion extending beyond said seat and enclosing the end of said rim.

3. A brake drum comprising a back and a rim mounted thereon, said back having a circular plate whose periphery forms a seat for the rim and a second plate concentric therewith with its marginal portion extending beyond said rim and spun over the end of said rim.

4. A brake drum comprising a back and a rim mounted thereon and provided with an exterior rib at the end thereof, said back having a circular seat fitting in the end of the rim and a marginal portion extending beyond said seat and tightly gripping the rib at the end of said rim.

5. A brake drum comprising a back member and a rim member mounted thereon, said rim member having exterior annular ribs, and said back member comprising a circular inner disk and an outer disk of greater diameter than the inner disk and with its marginal portion spun over the end of said rim member.

6. A brake drum comprising a back member and a rim member mounted thereon, said rim member having exterior annular ribs, and said back member comprising a circular inner disk and an outer disk welded together, the outer disk being of greater diameter than the inner disk and having its marginal portion spun over the end rib of said rim member.

7. A brake drum comprising a back member and a rim member mounted thereon, said back member comprising a circular inner disk tightly fitted in one end of said rim, an outer disk of greater diameter than the inner disk and with its marginal portion spun over said end of the rim and a wide spacing ring interposed between the central portions of said disks, said disks being welded together and to said interposed ring.

8. A brake drum comprising a back member and a rim member mounted thereon, said rim member having exterior annular ribs, said back member comprising a circular inner disk tightly fitted in one end of said rim, an outer disk of greater diameter than the inner disk and with its marginal portion spun over said end of the rim and a wide spacing ring interposed between the central portions of said disks, said disks being welded together and to said interposed ring.

9. A brake drum comprising a back member and a rim member mounted thereon, said rim member having exterior annular ribs, said back member comprising a circular inner disk tightly fitted in an end of said rim, an outer disk of greater diameter than the inner disk and with its marginal portion spun over said end of the rim and a wide ring interposed between the central portions of said disks, said disks being welded together and to said interposed ring, and said back member having holes extending through said ring to receive fastening devices.

TRACY V. BUCKWALTER.